United States Patent
Malloy (10) Patent No.: US 8,638,898 B2
(45) Date of Patent: Jan. 28, 2014

(54) EMERGENCY CORE COOLING SYSTEM FOR PRESSURIZED WATER REACTOR

(75) Inventor: John D. Malloy, Goode, VA (US)

(73) Assignee: Babcock & Wilcox mPower, Inc., Charlotte, NC (US)

( * ) Notice: Subject to any disclaimer, the term of this patent is extended or adjusted under 35 U.S.C. 154(b) by 460 days.

(21) Appl. No.: 13/069,657

(22) Filed: Mar. 23, 2011

(65) Prior Publication Data

US 2012/0243651 A1    Sep. 27, 2012

(51) Int. Cl.
*G21C 9/00*    (2006.01)

(52) U.S. Cl.
USPC ............ 376/282; 376/210; 376/298; 376/299

(58) Field of Classification Search
USPC .................................. 376/210, 282, 298, 299
See application file for complete search history.

(56) References Cited

U.S. PATENT DOCUMENTS

| 4,830,815 A * | 5/1989 | Gluntz .......................... 376/299 |
| 5,180,543 A * | 1/1993 | Conway et al. ................ 376/282 |
| 2009/0225923 A1* | 9/2009 | Neeley et al. ................. 376/186 |

* cited by examiner

*Primary Examiner* — Timothy A Brainard
(74) *Attorney, Agent, or Firm* — Michael J. Seymour; Eric Marich (57) ABSTRACT

A pressurized water nuclear reactor (PWR) has an internal pressurizer volume containing a steam bubble and is surrounded by a containment structure. A condenser is disposed inside the containment structure and is operatively connected with an external heat sink disposed outside of the containment structure. A valve assembly operatively connects the PWR with the condenser responsive to an abnormal operation signal such that the condenser condenses steam from the steam bubble while rejecting heat to the external heat sink and returns the condensed water to the PWR. A quench tank contains water with dissolved neutron poison. A valved tank pressurizing path selectively connects the steam bubble to the quench tank to pressurize the quench tank, and a valved soluble poison delivery path selectively connects the quench tank to the PWR such that the quench tank under pressure from the steam bubble discharges water with dissolved neutron poison into the PWR.

19 Claims, 2 Drawing Sheets

EMERGENCY CORE COOLING SYSTEM FOR PRESSURIZED WATER REACTOR

BACKGROUND

The following relates to the nuclear reactor arts, electrical power generation arts, nuclear safety arts, and related arts.

Nuclear reactors employ a reactor core comprising a mass of fissile material, such as a material containing uranium oxide ($UO_2$) that is enriched in the fissile $^{235}U$ isotope. Primary coolant water, such as light water ($H_2O$) or heavy water ($D_2O$) or some mixture thereof, flows through the reactor core to extract heat for use in heating secondary coolant water to generate steam or for some other useful purpose. For electrical power generation, the steam is used to drive a generator turbine. In thermal nuclear reactors, the primary coolant water also serves as a neutron moderator that thermalizes neutrons, which enhances reactivity of the fissile material. Various reactivity control mechanisms, such as mechanically operated control rods, chemical treatment of the primary coolant with a soluble neutron poison, or so forth are employed to regulate the reactivity and resultant heat generation. In a pressurized water reactor (PWR), the primary coolant water is maintained in a superheated state in a sealed pressure vessel that also contains the reactor core. In the PWR, both pressure and temperature of the primary coolant water are controlled.

To extract power from the PWR or other nuclear reactor, secondary coolant water is flowed in thermal communication with the primary coolant water. A steam generator device is suitably used for this thermal exchange. In the steam generator, heat (i.e., energy) is transferred from the reactor core to the secondary coolant water via the intermediary of the primary coolant water. This heat converts the secondary coolant water from liquid water to steam. The steam is typically flowed into a turbine or other power conversion apparatus that makes practical use of the steam power. Viewed another way, the steam generator also serves as a heat sink for the primary coolant.

The steam generator may, in general, be located external to the pressure vessel, or internal to the pressure vessel. A PWR with an internal steam generator is sometimes referred to as an integral PWR, an illustrative example of which is shown in Thome et al., "Integral Helical Coil Pressurized Water Nuclear Reactor", U.S. Pub. No. 2010/0316181 A1 published Dec. 16, 2010 which is incorporated herein by reference in its entirety. This publication discloses a steam generator employing helical steam generator tubing; however, other coil geometries including straight (e.g., vertical) steam generator tubes are also known. This publication also discloses an integral PWR in which the control rod drive mechanism (CRDM) is also internal to the pressure vessel; however, external CRDM designs are also known. Some illustrative examples of internal CRDM designs include: Stambaugh et al., "Control Rod Drive Mechanism for Nuclear Reactor", U.S. Pub. No. 2010/0316177 A1 published Dec. 16, 2010 which is incorporated herein by reference in its entirety; and Stambaugh et al., "Control Rod Drive Mechanism for Nuclear Reactor", Intl Pub. WO 2010/144563 A1 published Dec. 16, 2010 which is incorporated herein by reference in its entirety.

During normal PWR operation, the primary coolant is subcooled and is at both elevated temperature and elevated pressure. For example, one contemplated integral PWR is designed to operate with the primary coolant at a temperature of greater than 300° C. and a pressure of about 2000 psia. These elevated conditions are maintained by emitted by the radioactive nuclear reactor core. In various abnormal event scenarios, this radioactivity can increase rapidly, potentially leading in turn to rapid and uncontrolled increase in primary coolant pressure and temperature. For example, in a "loss of heat sink event" the secondary coolant flow in the steam generator fails, leading to loss of heat sinking provided by the secondary coolant. In a scram failure, the control rod system is compromised such that the control rods may be unable to "scram", that is, be released to fall into the reactor core, to provide rapid shutdown. While a scram failure may not cause immediate core heating, the loss of this safety system typically calls for immediate shutdown of the reactor. In a loss of coolant accident (LOCA), a rupture in the pressure vessel allows some of the primary coolant to be released under pressure from the pressure vessel. The released primary coolant generally expands as steam outside of the pressure vessel. A LOCA introduces numerous potential safety issues such as a possible release of radioactivity, emission of hot steam, and so forth. The loss of coolant as the reactor depressurizes can result in a condition where there is insufficient coolant left in the reactor vessel to cool the core. The resulting fuel damage releases fission products contained with the fuel.

In view of such concerns, a PWR typically has an external containment structure to contain any release of primary coolant in a LOCA. The PWR also typically has an associated emergency core cooling system (ECCS) that is designed to respond to an abnormal condition by bringing about rapid cooling of the reactor core, suppressing any concomitant pressure increase, and recapturing any released primary coolant steam. The ECCS should operate in a failsafe manner. However, designing the ECCS to provide failsafe operation for a range of potential abnormal conditions such as loss of heat sinking, scram failure, or LOCA is difficult.

Disclosed herein are improvements that provide various benefits that will become apparent to the skilled artisan upon reading the following.

BRIEF SUMMARY in one aspect of the disclosure, an apparatus comprises a pressurized water reactor (PWR) including a pressure vessel containing a nuclear reactor core and primary coolant water. The pressure vessel defines an internal pressurizer volume containing a steam bubble and having at least one steam pressure containment structure surrounds the PWR. An external heat sink is disposed outside of the containment structure. A condenser is disposed inside the containment structure and is operatively connected with the external heat sink. A valve assembly comprising one or more valves operatively connects the PWR with the condenser responsive to an abnormal operation signal such that the condenser condenses steam from the steam bubble while rejecting heat to the external heat sink and returns the condensed water to the PWR.

In another aspect of the disclosure, a method comprises: operating a PWR disposed in a containment structure, the PWR including a pressure vessel containing a nuclear reactor core and primary coolant water and an internal pressure regulating steam bubble; and, responsive to an abnormal operation signal, performing an emergency core cooling process including operatively connecting a condenser disposed in the containment structure with the PWR to condense steam from the steam bubble while rejecting heat to an external heat sink disposed outside of the containment structure and to return the condensed water to the PWR. In some such methods, an inlet of the condenser is connected with the steam bubble during the operating, and the operative connecting responsive to an abnormal operation signal comprises connecting an outlet of the condenser with the PWR to return the condensed water to the PWR. In some such methods, after the operative connecting and responsive to pressure in the pressure vessel decreasing below a pressure threshold, the outlet of the condenser is connected with a sparger discharging into a water storage tank disposed inside the containment structure.

In another aspect of the disclosure, a method comprises: operating a PWR disposed in a containment structure, the PWR including a pressure vessel containing a nuclear reactor core and primary coolant water and an internal pressure regulating steam bubble; and performing an emergency core cooling process including operatively connecting a quench tank containing water with dissolved neutron poison with the PWR such that the steam bubble pressurizes the quench tank to discharge water with dissolved neutron poison into the PWR. In some such methods, the dissolved neutron poison comprises a soluble boron compound. In some such methods, the operating comprises operating the PWR including said pressure vessel containing said nuclear reactor core and said primary coolant water wherein the primary coolant water does not contain a dissolved neutron poison.

In another aspect of the disclosure, an apparatus comprises: a PWR including a pressure vessel containing a nuclear reactor core, primary coolant water, and a pressure regulating steam bubble; a quench tank containing water with dissolved neutron poison; a valved tank pressurizing path selectively connecting the steam bubble to the quench tank to pressurize the quench tank; and a valved soluble poison delivery path selectively connecting the quench tank to the PWR such that the quench tank under pressure from the steam bubble discharges water with dissolved neutron poison into the PWR.

In another aspect of the disclosure, an apparatus comprises: a PWR including a pressure vessel containing a nuclear reactor core and primary coolant water, the pressure vessel defining an internal pressurizer volume containing a steam bubble and having at least one steam pressure control device; a containment structure surrounding the PWR; an external heat sink disposed outside of the containment structure; at least one condenser disposed inside the containment structure and operatively connected with the external heat sink; and a valve assembly comprising one or more valves, the valve assembly configured to (1) respond to a loss of heat sink event by operatively connecting the at least one condenser with the PWR to condense steam from the steam bubble and return the condensed water to the PWR and to (2) response to a loss of coolant accident (LOCA) by operatively connecting the at least one condenser with the PWR to condense steam from the steam bubble and return the condensed water to the PWR.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

DETAILED DESCRIPTION OF THE PREFERRED EMBODIMENTS

Figure 1:
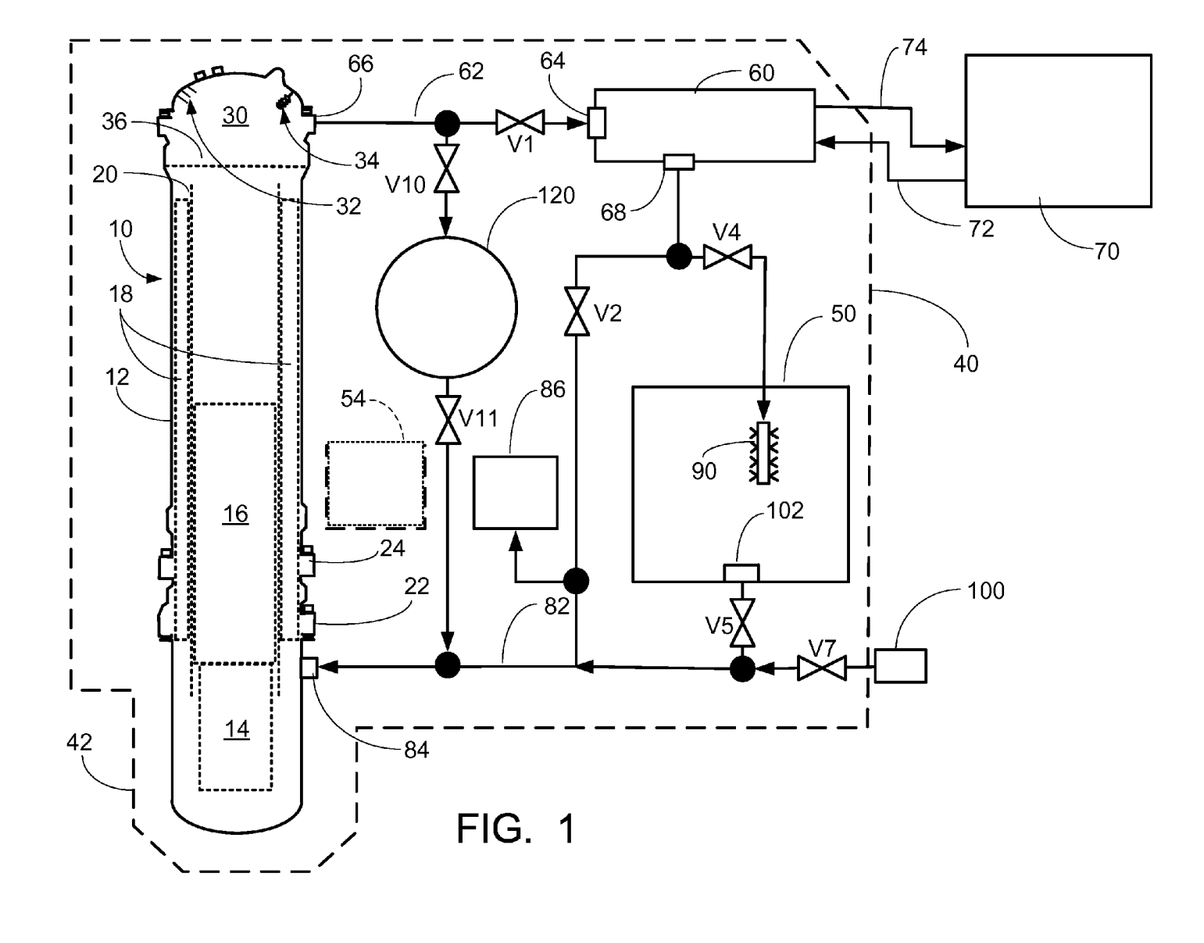
FIG. 1 diagrammatically shows an illustrative pressurized water reactor (PWR) together with its associated containment structure and a schematic diagram of associated emergency core cooling system (ECCS).

With reference to FIG. 1, an illustrative nuclear reactor of the pressurized water reactor (PWR) type 10 includes a pressure vessel 12, which in the illustrative embodiment is a generally cylindrical vertically mounted vessel. Selected components of the PWR that are internal to the pressure vessel 12 are shown diagrammatically in phantom (that is, by dotted lines). A nuclear reactor core 14 is disposed in a lower portion of the pressure vessel 12. The reactor core 14 includes a mass of fissile material, such as a material containing uranium oxide ($UO_2$) that is enriched in the fissile $^{235}U$ isotope, in a suitable matrix material. In a typical configuration, the fissile material is arranged as "fuel rods" arranged in a core basket. The pressure vessel 12 contains primary coolant water (typically light water, that is, $H_2O$, although heavy water, that is, $D_2O$, is also contemplated) in a subcooled state.

A control rod system 16 is mounted above the reactor core 14 and includes control rod drive mechanism (CRDM) units and control rod guide structures configured to precisely and controllably insert or withdraw control rods into or out of the reactor core 14. The illustrative control rod system 16 employs internal CRDM units that are disposed inside the pressure vessel 12. Some illustrative examples of suitable internal CRDM designs include: Stambaugh et al., "Control Rod Drive Mechanism for Nuclear Reactor", U.S. Pub. No. 2010/0316177 A1 published Dec. 16, 2010 which is incorporated herein by reference in its entirety; and Stambaugh et al., "Control Rod Drive Mechanism for Nuclear Reactor", Int'l Pub. WO2010/144563A1 published Dec. 16, 2010 which is incorporated herein by reference in its entirety. In general, the control rods contain neutron absorbing material, and reactivity is increased by withdrawing the control rods or decreased by inserting the control rods. So-called "gray" control rods are continuously adjustable to provide incremental adjustments of the reactivity. So-called "shutdown" control rods are designed to be inserted as quickly as feasible into the reactor core to shut down the nuclear reaction in the event of an emergency. Various hybrid control rod designs are also known. For example, a gray rod may include a mechanism for releasing the control rod in an emergency so that it falls into the reactor core 12 thus implementing a shutdown rod functionality.

The illustrative PWR 10 is an integral PWR, and includes an internal steam generator 18 disposed inside the pressure vessel 12. In the illustrative configuration, a cylindrical riser 20 is disposed coaxially inside the cylindrical pressure vessel 12. The riser 20 surrounds the control rods system 16 and extends upward, such that primary coolant water heated by the operating nuclear reactor core 14 rises upward through the cylindrical riser 20 toward the top of the pressure vessel, where it discharges, reverses flow direction and flows downward through an outer annulus defined between the cylindrical riser 20 and the cylindrical wall of the pressure vessel 12. This circulation may be natural circulation that is driven by reactor core heating and subsequent cooling of the primary coolant, or the circulation may be assisted or driven by primary coolant pumps (not shown). The illustrative steam generator 18 is an annular steam generator disposed in the outer annulus defined between the cylindrical riser 20 and the cylindrical wall of the pressure vessel 12. Vertically, the lower end of the illustrative steam generator 18 partially overlaps the control rod system 16, and the steam generator 18 extends upward to near the top of the cylindrical riser 20. The steam generator provides independent but proximate flow paths for downwardly flowing primary coolant and upwardly flowing secondary coolant. The secondary coolant enters at a feedwater inlet 22, flows upward through the steam generator 18 where it is heated by the proximate downwardly flowing primary coolant to be converted to steam, and the steam discharges at a steam outlet 24.

FIG. 1 does not illustrate the detailed structure of the steam generator. Typically, the steam generator comprises steam generator tubes and a surrounding volume (or "shell") containing the tubes, thus providing two proximate flow paths that are in fluid isolation from each other. In some embodiments, the primary coolant flows downward through the steam generator tubes (that is, "tube-side") while the secondary coolant flows upward through the surrounding volume (that is, "shell-side"). In other embodiments, the primary coolant flows downward through the surrounding volume (shell-side) while the secondary coolant flows upward through the steam generator tubes (tube-side). In either configuration, the steam generator tubes can have various geometries, such as vertical straight tubes (sometimes referred to as a straight-tube once-through steam generator or "OTSG"), helical tubes encircling the cylindrical riser 20 (some embodiments of which are described, by way of illustrative example, in Thome et al., "Integral Helical Coil Pressurized Water Nuclear Reactor", U.S. Pub. No. 2010/0316181 A1 published Dec. 16, 2010 which is incorporated herein by reference in its entirety), or so forth.

It will be noticed in FIG. 1 that the illustrative PWR 10 has the steam outlet 24 located at a low position, that is, near the bottom of the steam generator 18. However, the secondary coolant is converted to steam as the secondary coolant flows upwardly through the steam generator 18, such that the hottest steam is expected to be present near the top of the steam generator 18. The placement of the steam outlet 24 located at its illustrated low position reflects the presence of an annular steam jacket (not shown) disposed between the steam generator 18 and the cylindrical wall of the pressure vessel 12. This steam jacketing approach is optional, but has the benefit of providing a higher temperature outer surface for maintaining temperature stability. In an alternative embodiment, the steam jacket is omitted and the steam outlet is located at or near the top of the steam generator 18.

The illustrative PWR 10 is an integral PWR including the steam generator 18 disposed inside the pressure vessel 12. In other embodiments, the PWR is not an integral PWR; rather the steam generator is located externally. In these embodiments, the feedwater inlet 22 and steam outlet 24 are suitably replaced by high pressure vessel penetrations flowing primary coolant water out of the pressure vessel, through the external steam generator, and back to the pressure vessel. Moreover, contemplated integral PWR designs may place the steam generator at various locations in the pressure vessel, such as partially surrounding the reactor core, or disposed inside cylindrical riser, or so forth.

The pressure vessel 12 defines a sealed volume that, when the PWR is operational, contains primary coolant water in a subcooled state. Toward this end, the PWR includes an internal pressurizer volume 30 disposed at the top of the pressure vessel 12. The internal pressurizer volume 30 contains a steam bubble volume whose pressure controls the pressure of the primary coolant water in the pressure vessel 12. At least one steam pressure control device is provided to adjust or control the pressure of the steam bubble in the internal pressurizer volume 30. By way of illustrative example, the steam pressure control device or devices may include a heater 32 (e.g., one or more resistive heaters) that heats the steam to increase pressure, and/or a sparger 34 that injects cool water or steam into the steam bubble to reduce pressure. A baffle plate 36 separates the internal pressurizer volume 30 from the remainder of the sealed volume of the pressure vessel 10. By way of illustrative example, in some embodiments the primary coolant pressure in the sealed volume of the pressure vessel 12 is at a pressure of about 2000 psia and at a temperature of about 300° C. (cold leg just prior to flowing into the reactor core 14) to 320° C. (hot leg just after discharge from the reactor core 14). These are merely illustrative subcooled conditions, and a diverse range of other operating pressures and temperatures are also contemplated.

With continuing reference to FIG. 1, the PWR 10 is disposed in a containment structure 40, which may by way of illustrative example comprise a concrete, steel, steel-reinforced concrete, or other structure. The containment structure 40 is intended to contain any release of primary coolant water from the PWR 10 in the event of a loss of coolant accident (LOCA). In some embodiments the containment structure 40 may be partially or wholly subterranean. In the illustrative embodiment, at least a flood well 42 portion of the containment structure is buried, and the lower portion of the PWR 10 including the nuclear reactor core 14 resides in this flood well 42.

FIG. 1 also diagrammatically depicts an emergency core cooling system (ECCS) configured to remediate various abnormal operating conditions such as a loss of heat sinking event, or a scram failure. The ECCS includes a water storage tank 50 disposed inside the containment 40. The water storage tank 50 is also sometimes referred to as a refueling water storage tank (since it may optionally be utilized as a source of make-up primary coolant water during refueling of the PWR 10) or as a reactor water storage tank. The water storage tank 50 is also referred to herein by the acronym "RWST" 50.

Figure 2:
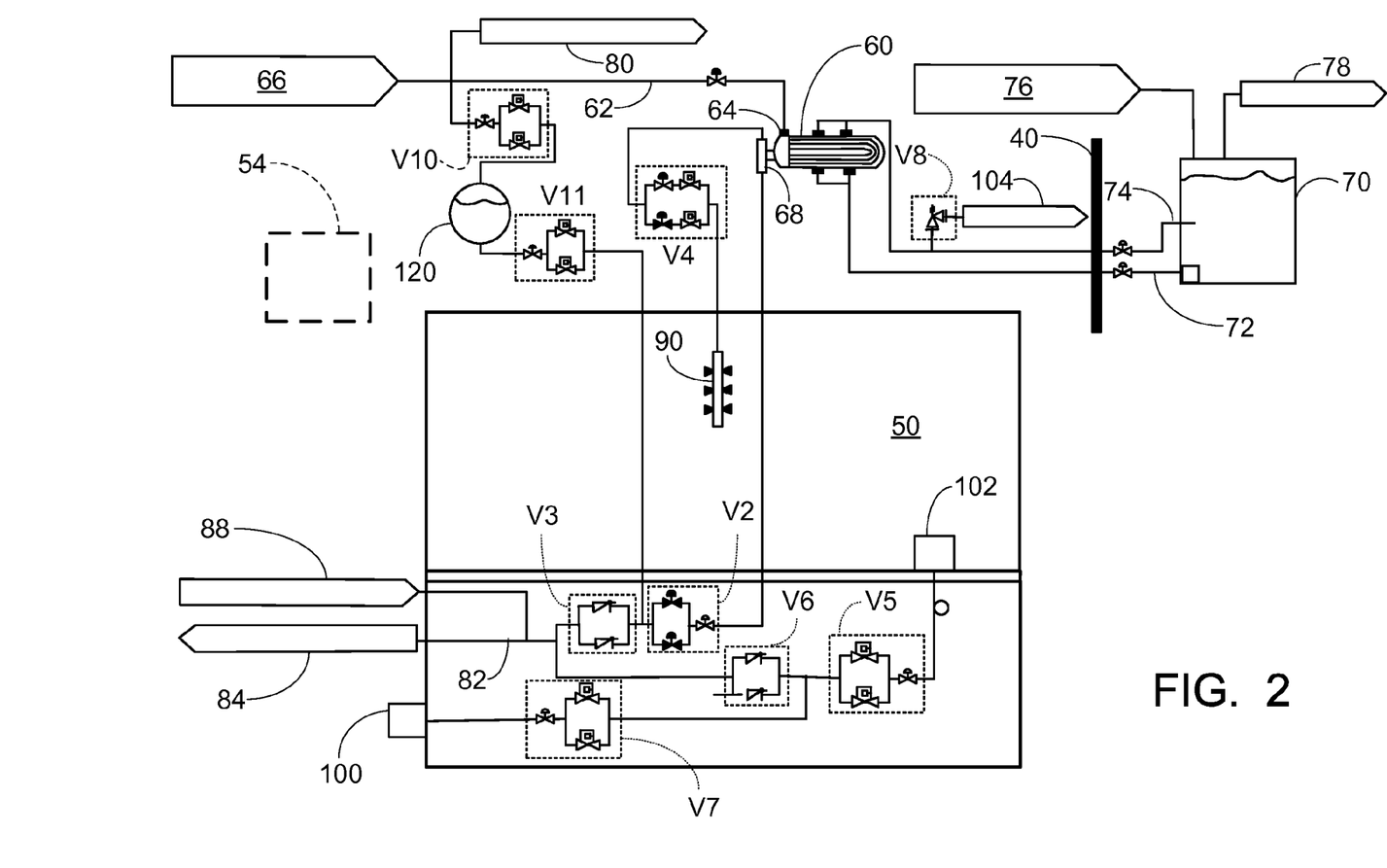
FIG. 2 diagrammatically shows a more detailed schematic diagram of the ECCS of FIG. 1.

With reference to FIG. 1 and with further reference to FIG. 2, the ECCS a valve assembly comprising valves and piping for selectively interconnecting the RWST 50 and various components of the ECCS with each other and/or with the PWR 10. FIG. 1 shows a schematic diagram of the illustrative ECCS embodiment, with emphasis on its interconnection with the PWR 10. FIG. 2 shows a more detailed schematic diagram of the ECCS of FIG. 1 that depicts some additional features that may optionally be included. It is to be appreciated that both FIG. 1 and FIG. 2 show schematic diagrams of the ECCS for the purpose of illustrating preferred embodiments, and it is to be understood that further additional or substitute features may also or alternatively be included based on considerations of the specific design implementation, applicable government regulations, or so forth.

In describing the illustrative ECCS embodiments, the following terminology is used herein. Terms such as "normally open" or "normally closed" refer to the normal condition or state of the valve or other element during normal operation of the PWR 10 for its intended purpose (for example, the intended purpose of generating electrical power in the case of a nuclear power plant). A term such as "abnormal operation signal" refers to a signal generated by a sensor or other device indicating that some metric or aspect of the PWR operation has deviated outside of the normal PWR operational space. By way of illustrative example, an abnormal operation signal may comprise a low reactor water level signal, or an abnormal operation signal may comprise a high reactor pressure signal. A low reactor water level signal may indicate a LOCA, while a high reactor pressure signal may indicate a LOCA or a loss of heat sinking event. Typically, abnormal operation signal (or a combination of such signals) will automatically trigger an audible, visual, or other alarm to notify reactor operation personnel of the deviation, and/or will trigger an automated response by the ECCS. In some cases and in some embodiments, reactor operation personnel may be able to override or cancel an automated ECCS response. In some cases and in some embodiments, the ECCS response to an abnormal operation signal or a combination of such signals may be initiated manually by reactor operation personnel.

To enable automatic alarm triggering and/or automated ECCS response, ECCS control circuitry 54 is provided. In FIGS. 1 and 2 the ECCS control circuitry 54 is diagrammatically indicated; however, it is to be understood that the ECCS control circuitry 54 includes suitable electronics, analog and/or digital circuitry, digital processor or digital control integrated circuit (IC) chips, or so forth along with suitable sensor devices in order to detect abnormal conditions, generate corresponding abnormal operation signals, activate visual and/or auditory alarms, and perform ECCS operations such as opening valves, closing valves, or so forth in order to implement suitable emergency core cooling operations in response to a detected abnormal condition. Some sensors that may be employed include: a pressure sensor for detecting an abnormally high reactor pressure and generating the high reactor pressure signal; a water level sensor for detecting a low level of primary coolant water in the pressure vessel 12 and generating the low reactor water level signal; an in-core temperature sensor for detecting an abnormally high temperature of the nuclear reactor core 14, or so forth.

Optionally, the ECCS control circuitry 54 may include processing capability in the form of a computer, microcontroller, or other digital processing device that is programmed or otherwise configured to process received abnormal operation signals and to generate suitable alarms and or cause the ECCS to perform a suitable automated response. In some embodiments, the ECCS control circuitry 54 is capable of making certain inferences in deciding a suitable response—for example, a combination of a low reactor water level signal and a low reactor pressure signal may be inferred to indicate a LOCA, whereas a high reactor pressure signal may be inferred to indicate a loss of heat sinking event. In embodiments in which an automated ECCS response is provided, the ECCS control circuitry 54 suitably includes actuation lines for causing valves to open or close. The actuation lines are typically wires or other electrical conductors, but other types of actuation such as pneumatic lines are also contemplated.

Some types of abnormal events that are to be remediated by the ECCS entail an increase in pressure in the PWR 10. For example, a loss of heat sinking event (for example, caused by a loss of feedwater flow into the feedwater inlet 22 of the steam generator 18) will produce heating that in turn increases pressure inside the PWR 10. A LOCA will similarly typically lead to heating and pressure increase. An uncontrolled or excessive pressure increase in the PWR 10 is problematic since it can compromise the sealing integrity of the pressure vessel 12 and can lead to escape of primary coolant water in the form of high pressure steam.

To control a pressure increase in the PWR 10, a condenser 60 is provided inside the containment structure 40. The condenser 60 is designed to operate at high pressure. The valve assembly includes a steam line 62 connecting the steam bubble in the internal pressurizer volume 30 of the PWR 10 with a condenser inlet 64 of the high pressure condenser 60. A steam vent vessel penetration 66 in the pressure vessel 12 is suitably provided for connecting the steam line 62 with the steam bubble in the internal pressurizer volume 30. The condenser 60 also has a condenser outlet 68 from which flows cooled steam, condensed water, or a cooled steam/water mixture. To provide failsafe operation, the condenser 60 is suitably a passive heat exchanger that rejects heat from the steam admitted at the condenser inlet 64 to an external heat sink 70 located outside of the containment structure 40.

The condenser 60 is suitably of a "once-through" design having tubes surrounded by a shell (details not shown). In one suitable embodiment, steam from the internal pressurizer volume 30 of the PWR 10 flows on the tube-side and water from the external heat sink 70 flows on the shell-side; however, the reverse configuration is also contemplated in which the steam flows on the shell-side and water from the external heat sink 70 flows tube-side. In either case, liquid water from the external heat sink 70 flows via a first pipe 72 into the condenser 60 where heat from the steam transfers to the cooler water from the external heat sink 70 causing the latter to boil or vaporize. The resulting water from the external heat sink 70 (now in a steam phase or mixed steam/water phase) flows via a second pipe 74 back to the external heat sink 70. The flow of water/steam from the external heat sink 70 in the pipes 72, 74 is driven by gravity and density difference between the inflowing water and the outflowing steam or mixed steam/water. In the illustrative embodiment, the pipes 72, 74 have open ends at the external heat sink side that are in fluid communication with water in the external heat sink 70 so that water from the external heat sink 70 flows into the first pipe 72 and the water/steam mixture discharges out of the second pipe 74 into the external heat sink 70. However, in an alternative embodiment, the open ends of the pipes 72, 74 are replaced by a heat exchanger coupling disposed in the external heat sink 70 (not shown) forming closed recirculation path in which the steam/water mixture from the second pipe 74 condenses back into water (rejecting the heat into the external heat sink 70 as before) and the recondensed water flows back into the first pipe 72.

The external heat sink 70 is suitably a body of water disposed outside the containment structure 40, such as a natural or artificial pond, lake, pool, or the like. Such an external heat sink 70 is also sometimes referred to as an "ultimate" heat sink. In some embodiments, the external heat sink 70 is located in a reactor services building or other structure or enclosure. The water volume of the external heat sink 70 should be sufficient to provide an extended period of operation of the high pressure condenser 60. For example, in some contemplated embodiments the external heat sink 70 is designed to have water volume sufficient for 72 hours continuous operation of the condenser 60. As diagrammatically indicated in FIG. 2, the external heat sink 70 may optionally include additional features such as a provision 76 for connection to other water sources (for example, to provide makeup water to the external heat sink 70 to further extend the period of operation of the condenser 60), and/or a vent 78 for releasing any steam that might be generated by the heat rejected from the condenser 60 into the ultimate heat sink 70. Note that if the external heat sink 70 is an open body of water or otherwise has sufficient exposed surface area, then the vent 78 is suitably omitted.

The condenser 60 is connected by the steam pipe 62 with the steam vent vessel penetration 66 in the pressure vessel 12, which in some suitable embodiments is 3-inch (7.6 cm) penetration although otherwise-sized penetrations are also contemplated. As shown in FIG. 2, a high pressure vent 80 is also optionally connected with the steam pipe 62 to relieve any pressure exceeding the design limits of the condenser 66. An isolation valve V1 provides the ability to isolate the condenser 60 from the vessel penetration 66 during maintenance or repair. In some embodiments, the isolation valve V1 is normally open, and remains open during an ECCS response to an abnormal event. With the isolation valve V1 normally open, it follows that the condenser 66 is under high pressure during normal operation of the PWR.

However, a valve V2 connected with the outlet 68 of the condenser 60 is normally closed. When an ECCS response calls for operation of the condenser 60, the valve V2 opens to allow flow from the steam bubble in the internal pressurizer volume 30 through the condenser 60 and to allow condensed water to flow through the opened valve V2 and into a reactor coolant inventory makeup line 82 that feeds into a vessel penetration 84 of the pressure vessel 12. This completes the flow circuit and allows the condensed water to flow back into the PWR. As shown in FIG. 1, in some embodiments a gas trap 86 is provided to trap gaseous nitrogen ($N_2$) or gaseous oxygen ($O_2$) that exits from the condenser outlet 68, in order to prevent these gases from entering into the pressure vessel 12.

As shown in FIG. 2, check valves V3 may be provided on the reactor coolant inventory makeup line 82 (or, more generally, in series with the valve V2) to prevent backflow of primary coolant water from the pressure vessel 12 into the valve assembly. The various valves V2, V3 may also have redundancy as shown in FIG. 2, and the valve V2 as shown in FIG. 2 also includes a normally open isolation valve. As still further shown in FIG. 2 the reactor coolant inventory makeup line 82 and vessel penetration 84 may also serve as an inlet to the pressure vessel 12 for a reactor coolant inventory supply line 88, which may be used to provide makeup water during normal operation of the PWR. While the single vessel penetration 84 in conjunction with the valve assembly components V2, V3 provides the inlet for these multiple functions, alternatively two or more separate vessel penetrations may be provided, and/or multiple redundant vessel penetrations may be provided for a given function.

The condenser 60 may be used in responding to various types of abnormal events, such as LOCA or loss of heat sinking events. In a suitable approach the ECCS control circuitry 54 opens the valve V2 to initiate operation of the condenser 60 responsive to a low reactor water level signal, a high reactor pressure signal, or the combination of both a low reactor water level signal and a high reactor pressure signal. The low reactor water level signal (either with or without a concomitant low reactor pressure signal) indicates a LOCA, while a high reactor pressure signal without a concomitant low reactor water level signal indicates an abnormal event other than a LOCA, such as a loss of heat sinking event. Thus, the same condenser 60 is used to respond to either a LOCA or a loss of heat sinking event.

A loss of heat sink event or other abnormal event other than a LOCA is indicated by a high reactor pressure signal without a concomitant low reactor water level signal. In such a case, the principal concern is overpressurization of the pressure vessel 12. Toward this end, opening the valve V2 to initiate operation of the condenser 60 is expected to be a sufficient immediate response.

In the case of a LOCA, however, there is a loss of primary coolant water from the pressure vessel 12, potentially causing exposure of the reactor core 14. Thus, a LOCA response entails opening the valve V2 to initiate operation of the condenser 60, and also expeditiously bringing about a state in which coolant can be added to the pressure vessel 12. To achieve the latter, it is desired to reduce the pressure in the pressure vessel 12 as quickly as possible, so that makeup water can be flowed into the pressure vessel 12 from the RWST 50.

The condenser 60 operates efficiently when the steam entering at the inlet 64 is hot, which typically corresponds to steam under high pressure. For such hot steam, the temperature difference between the steam and the water flowing into the condenser 60 from the external heat sink 70 is large, leading to efficient rejection of heat to the external heat sink 70. However, as the pressure decreases (typically corresponding to cooler steam), efficiency of the condenser 60 decreases, and so the pressure reduction approximately exponential as a function of time with a long low-pressure "tail". This slow late-stage depressurization is disadvantageous in responding to a LOCA because it delays achieving the state in which makeup water can be flowed into the pressure vessel 12 from the RWST 50.

Accordingly, when responding to a LOCA the condenser 60 operates analogously to the response to a loss of heat sinking event or other non-LOCA event until the pressure in the pressure vessel 12 decreases to below a preselected pressure threshold. Once the pressure threshold is released, a low pressure vent valve V4 opens to connect the condenser outlet 68 with a sparger 90 discharging into the RWST 50. As shown in FIG. 2, the low pressure vent valve V4 may be a composite valve or sub-assembly including two redundant paths each comprising an air-operated valve (reopening) followed by a squib valve (non-reopening) arranged in series. The vent path including the low pressure vent valve V4 and the sparger 90 is sized to depressurize the reactor sufficiently to allow initiation of flow of makeup water from the RWST 50. In the illustrative configuration, the vent line including the low pressure vent valve V4 and sparger 90 is arranged in parallel with the condensate return path comprising the valves V2, V3, reactor coolant inventory makeup line 82, and vessel penetration 84—thus, the condenser 60 continues to operate while the sparger 90 accelerates depressurization.

Once the reactor is sufficiently depressurized by action of the sparger 90, a valve V5 opens to allow water to flow from the RWST 50 into the reactor coolant inventory makeup line 82 and vessel penetration 84 in order to provide makeup water to compensate for primary coolant water lost in the LOCA. As shown in FIG. 2, the valve V5 may have redundancy, and may also include a normally open isolation valve. In a suitable embodiment, the valve V5 includes parallel squib valves that are actuated concurrently with the low pressure vent valve. V4 and the sparger 90. As further shown in FIG. 2, the valve V5 may be placed in series with a check valve V6 (which again, may include redundancy as shown in FIG. 2) in order to prevent backflow of primary coolant water from the pressure vessel 12 into the RWST 50. Flow of water from the RWST 50 to the pressure vessel 12 via the valves V5, V6, reactor coolant inventory makeup line 82, and vessel penetration 84 starts when the reactor pressure is less than the sum of the pressure in the containment structure 40 and the gravity head provided by the water level in the RWST 50. Toward this end, the RWST 50 is preferably located at an elevated position in the containment structure 40.

In some LOCAs, the water capacity of the RWST 50 may be insufficient to ensure that the reactor core 14 remains immersed. For example, a LOCA initiated by a pipe break at a lower flange or low vertical position may result in a large quantity of the primary coolant water being drained from the reactor cavity. In such cases, an external water inlet 100 provides additional water through a valve V7. As seen in FIG. 2, this additional water inlet should feed into the reactor coolant makeup line 82 at a point upstream of the check valve V6. If the water inlet 100 is connected with a commercial water supply or other source of unfiltered water, then the water inlet 100 may include a screen or other filter to ensure that particulates do not enter the pressure vessel 12. (Similarly, a screen or filter 102 may be provided to clean water coming from the RWST 50 prior to flowing into the reactor coolant inventory makeup line 82.) As shown in FIG. 2, the valve V7 may have redundancy and also may include a normally open isolation valve. Although not illustrated in FIG. 2, the water supply feeding into the water inlet 100 may be the same as reactor coolant inventory supply line 88 that provides makeup water during normal operation of the PWR.

With reference to FIG. 2, in some embodiments the available sparger 90 is also used as a vent for the second pipe 74 flowing steam or mixed water/steam back to the external heat sink 70. Toward this end, a connection 104 is diagrammatically shown in FIG. 2 to indicate a connection from the second pipe 74 to the sparger 90. A valve V8 is suitably configured to open if the pressure in the second pipe 74 exceeds a venting threshold pressure. The connection 104 and valve V8 should be located inside the containment structure 40.

Some types of abnormal events that are to be remediated by the ECCS may not entail an increase in pressure in the PWR 10. For example, a scram failure entails a malfunction of the control rods system 16. In one type of scram failure, the control rods fail to insert adequately—this is sometimes also referred to as an anticipated transient without scram (ATWS). Scram failure may also be preemptively identified, for example by a CRDM diagnostic detecting an incipient problem. Typically, a scram failure does not generate an immediate problem such as a pressure rise or temperature rise; nonetheless, the scram failure would compromise the ability to respond to other types of failure (e.g., a LOCA or a loss of heat sinking event) and accordingly typically calls for immediate shutdown of the reactor.

In some PWR systems, a secondary source of reactivity control is also provided in the form of a soluble poison injection system for delivering a controlled amount of dissolved soluble neutron poison into the primary coolant water. For example, the soluble neutron poison may comprise sodium pentaborate or another soluble boron compound. In such systems, the soluble poison injection system is used during normal PWR operation and under normal conditions the primary coolant water includes a controlled amount of dissolved boron compound or other dissolved neutron poison. In such PWR systems, the preexisting soluble poison injection system can also be used as part of the ECCS. In such a system, a scram failure response includes delivering a high concentration of soluble neutron poison into the primary coolant so as to quench core reactivity. However, there are disadvantages to employing soluble poison such as a boron compound during normal PWR operation. For example, dissolved boric acid is corrosive and can corrode some steel surfaces, potentially compromising the sealing integrity of the pressure vessel.

In the illustrative system of FIGS. 1 and 2, the primary coolant water in the pressure vessel 12 does not contain dissolved neutron poison such as a boron compound during normal PWR operation. However, a tank 120 containing a solution of soluble neutron poison is provided for responding to a scram failure by delivering a high concentration of soluble neutron poison into the primary coolant water in the pressure vessel 12 so as to quench core reactivity. In the illustrative embodiment, the quench tank 120 is an emergency boron tank 120 containing a concentrated solution of sodium pentaborate or another soluble boron compound; however, the quench tank may in general contain a solution of another species of soluble poison. The emergency boron tank 120 is not used during normal operation of the PWR 10, and does not include a compressed gaseous nitrogen ($N_2$) tank or other dedicated pressure source. Rather, the boron tank 120 is connected with the steam line 62 via a valve V10 to provide pressurization in the event of a scram failure. The steam line 62 is also connected with the high pressure condenser 60 via the normally open valve V1, and accordingly is already available for use in pressurizing the emergency boron tank 120 by adding the additional valve V10. The emergency boron tank 120 is also connected with the reactor coolant inventory makeup line 82 that feeds into a vessel penetration 84 of the pressure vessel 12 via a valve V11. The connection of the emergency boron tank 120 with the reactor coolant inventory makeup line 82 is upstream of the check valve V3 to prevent backflow of primary coolant water from the pressure vessel 12 into the boron tank 120. The valves V10, V11 may have redundancy and/or a normally open isolation valve, as shown in FIG. 2. The valves V10, V11 are normally closed (that is, are closed during normal operation of the PWR 10). In some embodiments the valves V10, V11 a composite valve or subassembly including a manual normally open isolation valve in series with two redundant (parallel) paths each comprising a squib valve (non-reclosing) arranged in series with a check valve to prevent backflow.

When the ECCS control circuitry 54 detects a scram failure, the valves V10, V11 are opened manually or by an automatic control signal from the ECCS control circuitry 54. Since a scram failure is typically not accompanied by immediate deviation of PWR metrics or parameters from the normal operating space, the valves V10, V11 are suitably manually operated valves in some embodiments. Opening the valve V10 places the steam bubble in the internal pressurizer volume 30 into fluid communication with the emergency boron tank 120 to pressurize the emergency boron tank 120. The emergency boron tank 120 is suitably located above the RWST 50. The relative pressure head between the pressurized boron tank 120 and the primary coolant water pressure vessel 12 allows the boron solution to flow into the pressure vessel 12 through the reactor coolant inventory makeup line 82 and the vessel penetration 84. If the PWR 10 employs primary coolant pumps to drive circulation of the primary coolant water in the pressure vessel 12, these pumps should be shut down during the boron solution injection process. (Similarly, primary coolant pumps are typically shut down during ECCS response to a LOCA or other ECCS response entailing passive flow into the pressure vessel 12). In a suitable embodiment, the emergency boron tank 120 contains a solution of sodium pentaborate in water of sufficient concentration and volume to shut down the PWR 10 with the highest worth control rod withdrawn from the reactor core 14 and to maintain shutdown at cold conditions.

The ECCS shown in FIGS. 1 and 2 is an illustrative example. It is to be understood that various levels of redundancy may be incorporated into the ECCS to failsafe operation. For example, in some embodiments, two redundant emergency boron tanks 120, each with its own valves V10, V11, is provided. Similarly, two high pressure condensers 60 may be provided, again each with its own separate associated valve set to maximize redundancy. Moreover, it is to be understood that various combinations of disclosed components or aspects may be employed in various embodiments. For example, the condenser 60 may be provided to respond to LOCA or loss of heat sinking events while omitting the emergency boron tank 120 and valves V10, V11 and providing a different response mechanism for scram failure. Conversely, the emergency boron tank 120 and valves V10, V11 may be provided for responding to scram failure, but in conjunction with different response mechanisms for responding to LOCA or loss of heat sinking events.

Further, while the emergency boron tank 120 and valves V10, V11 is described in an illustrative embodiment in which soluble boron compound is not used in normal PWR operation, it is also contemplated to employ the emergency boron tank 120 and valves V10, V11 in conjunction with a PWR that uses boron for reactivity control during normal PWR operation. Other such combinations and variations are also contemplated.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

I claim:

1. An apparatus comprising:
    a pressurized water reactor (PWR) including a pressure vessel containing a nuclear reactor core and primary coolant water, the pressure vessel defining an internal pressurizer volume containing a steam bubble and having at least one steam pressure control device;
    a containment structure surrounding the PWR;
    an external heat sink disposed outside of the containment structure;
    a condenser disposed inside the containment structure and operatively connected with the external heat sink; and
    a valve assembly comprising one or more valves, the valve assembly operatively connecting the PWR with the condenser responsive to an abnormal operation signal such that the condenser condenses steam from the steam bubble while rejecting heat to the external heat sink and returns the condensed water to the PWR.

2. The apparatus of claim 1, wherein the external heat sink comprises a body of water disposed outside the containment structure.

3. The apparatus of claim 1, wherein the valve assembly includes:
    a valved steam path connecting the internal pressurizer volume with an inlet of the condenser to convey steam from the steam bubble to the condenser; and
    a valved return path connecting an outlet of the condenser with the PWR to convey the condensed water to the PWR;
    wherein the valved steam path is configured to be open during normal operation of the PWR and the valved return path is configured to be closed during normal operation of the PWR.

4. The apparatus of claim 3, wherein the valved return path is configured to open responsive to an abnormal operation signal comprising a low reactor water level signal and is configured to open responsive to an abnormal operation signal comprising a high reactor pressure signal.

5. The apparatus of claim 1, wherein:
    the condenser comprises a plurality of condensers; and
    the valve assembly is configured to operatively connect the PWR with the plurality of condensers responsive to an abnormal operation signal comprising a low reactor water level signal and is configured to operatively connect the PWR with the same plurality of condensers responsive to an abnormal operation signal comprising a high reactor pressure signal.

6. The apparatus of claim 1, further comprising:
    a quench tank containing water with dissolved neutron poison disposed inside the containment structure;
    the valve assembly further including:
        a valved tank pressurizing path selectively connecting the internal pressurizer volume to the quench tank to pressurize the quench tank; and
        a valved soluble poison delivery path selectively connecting the quench tank to the PWR such that the quench tank under pressure from the internal pressurizer volume via the valved tank pressurizing path discharges water with dissolved neutron poison into the PWR.

7. The apparatus of claim 6, wherein the dissolved neutron poison comprises a soluble boron compound.

8. The apparatus of claim 6, wherein the dissolved neutron poison comprises sodium pentaborate.

9. The apparatus of claim 6, wherein the valved tank pressurizing path is not connected with any pressurizing source other than the internal pressurizer volume to pressurize the quench tank.

10. The apparatus of claim 6, wherein the primary coolant water in the pressure vessel of the PWR does not contain dissolved neutron poison other than dissolved neutron poison received from the quench tank.

11. The apparatus of claim 1, further comprising:
    a water storage tank disposed inside the containment structure;
    the valve assembly further connecting an outlet of the condenser with a sparger discharging into the water storage tank responsive to (1) the abnormal operation signal and (2) pressure in the pressure vessel decreasing below a threshold.

12. A method comprising:
    operating a pressurized water reactor (PWR) disposed in a containment structure, the PWR including a pressure vessel containing a nuclear reactor core and primary coolant water and an internal pressure-regulating steam bubble; and
    responsive to an abnormal operation signal, performing an emergency core cooling process including operatively connecting a condenser disposed in the containment structure with the PWR to condense steam from the steam bubble while rejecting heat to an external heat sink disposed outside of the containment structure and to return the condensed water to the PWR.

13. The method of claim 12, wherein an inlet of the condenser is connected with the steam bubble during the operating, and the operative connecting responsive to an abnormal operation signal comprises connecting an outlet of the condenser with the PWR to return the condensed water to the PWR.

14. The method of claim 13, wherein the emergency core cooling process further comprises:
    after the operative connecting and responsive to pressure in the pressure vessel decreasing below a pressure threshold, connecting the outlet of the condenser with a sparger discharging into a water storage tank disposed inside the containment structure.

15. The method of claim 12, wherein the emergency core cooling process is performed responsive to any of (1) a low reactor water level signal, (2) a high reactor pressure signal, and (3) both said low reactor water level signal and said high reactor pressure signal.

16. An apparatus comprising:
    a pressurized water reactor (PWR) including a pressure vessel containing a nuclear reactor core and primary coolant water, the pressure vessel defining an internal pressurizer volume containing a steam bubble and having at least one steam pressure control device;
    a containment structure surrounding the PWR;
    an external heat sink disposed outside of the containment structure;
    at least one condenser disposed inside the containment structure and operatively connected with the external heat sink; and
    a valve assembly comprising one or more valves, the valve assembly configured to (1) respond to a loss of heat sink event by operatively connecting the at least one condenser with the PWR to condense steam from the steam bubble and return the condensed water to the PWR and to (2) response to a loss of coolant accident (LOCA) by operatively connecting the at least one condenser with the PWR to condense steam from the steam bubble and return the condensed water to the PWR.

17. The apparatus of claim 16, wherein the valve assembly includes:
   a valved steam path connecting the internal pressurizer volume with an inlet of the at least one condenser to convey steam from the steam bubble to the condenser; and
   a valved return path connecting an outlet of the at least one condenser with the PWR to convey the condensed water to the PWR;
   wherein the valved steam path is configured to be open during normal operation of the PWR and the valved return path is configured to be closed during normal operation of the PWR; and
   wherein the valved return path is configured to open responsive to detection of either a loss of heat sink event or a LOCA.

18. The apparatus of claim 17, wherein the valved return path is configured to open to a sparger discharging into a water storage tank disposed inside the containment responsive to detection of a LOCA and pressure in the pressure vessel decreasing below a threshold pressure.

19. The apparatus of claim 16, wherein the external heat sink comprises at least one body of water disposed outside the containment structure and the operative connection of the at least one condenser with the external heat sink comprises an open tube connection in which water from the external heat sink flows by natural circulation through the at least one condenser.

\* \* \* \* \*